United States Patent Office 3,355,302
Patented Nov. 28, 1967

3,355,302
ANTI-SPATTERING PLASTIC SHORTENING
Edward R. Purves, Springfield Township, Hamilton County, Louis H. Going, Loveland, and Robert D. Dobson, Greenhills, Ohio, assignors to The Procter & Gamble Company, Cincinnati, Ohio, a corporation of Ohio
No Drawing. Filed Jan. 24, 1964, Ser. No. 339,909
5 Claims. (Cl. 99—163)

ABSTRACT OF THE DISCLOSURE

A plastic shortening suitable for frying and baking purposes contains from about 0.2% to about 1.0% by weight of a fatty acid monoester of polyoxyethylene sorbitan containing an average of about 20 oxyethylene units per molecule, said fatty acid having from about 12 to about 22 carbon atoms per molecule. Preferably, the fatty acid monoester is acid-treated, and/or the plastic shortening contains from about 0.01% to about 0.25% by weight of an oil-insoluble, water-soluble salt of phosphoric acid.

---

This invention relates to an improved shortening and, more particularly, to an improved plastic shortening which is suitable for frying and baking purposes.

A large variety of shortenings are available on the market today for various cooking and other food purposes. Most of these shortenings are essentially glycerides of one sort or another; they are generally derived from animal, vegetable and marine fats and oils.

Although the animal fats, such as butterfat, lard and tallow, generally are solid or "plastic" in consistency, the naturally-occurring vegetable oils, such as olive, corn, soybean and cottonseed oil, are generally liquid in consitency. These naturally-occurring liquid vegetable oils are of great importance as cooking and salad oils but frequently are not best suited for certain important baking purposes, for example, for preparing bakery products which require the production of a highly developed dough structure, such as a layer cake. In order to be made more useful for such purposes, these oils are usually subjected to special chemical or physical processing, such as plasticizing, or else combined with certain edible additives which fortify the base oil.

As mentioned above, one of the most common treatments for improving the baking properties of the naturally-occuring liquid vegetable oils is to plasticize them. This is usually accomplished by partially hydrogenating the entire mass of the oil, or by the addition of a small amount of highly hydrogenated triglyceride to the oil, accompanied with proper chilling and crystallization techniques. To these plasticized shortenings are frequently added emulsifiers such as the mono- and diglycerides which impart so-called "high ratio" properties to the shortening.

In addition to imparting better baking properties to the liquid oil, partial hydrogenation gives the oil greater oxidative stability. As a result of this improved stability, the partially hydrogenated or plastic shortenings are frequently preferred for use in commercial products such as potato chips and crackers which are usually subjected to long periods of storage.

The oxidative stability of liquid oils can, of course, be improved by the use of additives without necessarily "plasticizing" the oil; however, most such improved oils still do not possess all of the most desirable properties of the best "plastic" shortenings, particularly, as already pointed out, the desired suitability for the production of bakery products having a highly developed dough structure. Also, these liquid oils do not naturally possess the attractive and pleasing "whiteness" in appearance of the best commercial plastic shortenings.

In recent years, a great number of edible additives have been disclosed as having various useful properties in shortenings. The mono- and diglycerides have been mentioned in connection with their "high ratio" properties for cake baking purposes. Other additives having both the long chain fatty acid radicals and the free hydroxyl groups of the mono- and diglycerides have been developed by synthesizing various other partial fatty acid esters of glycerol or of other polyols such as the dihydric alcohols and the higher polyols such as the sugar alcohols. In some cases, the complete esters have been found to be useful. For forming either partial or complete esters of fatty acids, the edible hydroxy-carboxylic acids such as lactic, tartaric, and citric acids have also been found to be useful.

The desirability of the above types of additives in shortening frequently depends upon the ultimate end use of the shortening which may be highly specific. While some additives may impart desirable cake emulsifying properties, they may at the same time impart an undesirably low smoke point such that the shortening is not best suited for frying purposes. Other additives may exhibit good smoke points or provide other desirable frying properties such as spatter reduction in the shortening, but they may then detract from the cake baking properties of the shortenings. Some additives have been found to be useful in a liquid or plastic shortening but have not proven to be useful in both. In order to improve the general purpose performance of various shortening additives, the additives themselves, as opposed to the shortenings, are frequently subjected to special processing treatment or are otherwise chemically or physically modified. Certain selected additives have been combined with other compatible materials to produce complementary or synergistic results in the shortening.

Of the various edible shortening additives which have been described in the prior art, two broad classes of materials which have been found to have certain limited uses are the "Spans" and "Tweens." The terms "Spans" and "Tweens" are trademarks of the sorbitol anhydride (or sorbitan) partial esters and the polyoxyethylene ethers of sorbitan partial esters, respectively. The "Span" type materials are disclosed in U.S. Patents 2,303,432 and 2,322,820–1; while the "Tween" type materials are disclosed in U.S. Patent 2,380,166. Certain useful properties of both of these and other types of materials in particular liquid shortenings are described in U.S. Patents 2,746,868 and 2,968,562–4.

Accordingly, it is a primary object of this invention to provide an improved plastic shortening which is suitable for both frying and baking purposes. It is also an object of this invention to provide a shortening additive system which when combined with a plastic shortening produces an excellent all purpose shortening that can be used for frying and baking.

These and other objects are achieved by emp'oying certain selected compounds of the above-mentioned "Tween" type of materials in a plastic shortening in a particular manner and in certain critical proportions.

Briefly stated, the plastic shortening of this invention comprises fatty glyceride having admixed therewith from about 0.2% to about 1.0%, and preferably about 0.5%, by weight, of a fatty acid monoester of polyoxyethylene sorbitan containing an average of about 20 oxyethylene units per molecule, said fatty acid having from about 12 to about 22 carbon atoms per molecule.

The fatty glycerides which are employed in the plastic shortening of this invention can be derived from animal, vegetable or marine fats and oils, and they can be synthetically produced. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like, and are generally obtained from edible triglyceride fats and oils such as cottonseed, soybean, coconut, rapeseed, peanut, olive, palm, palm kernel, corn sunflower, safflower, sesame seed, rice bran, wallflower, nasturtium seed, mustard seed, whale, sardine, herring, menhaden, and pilchard, oils as well as from lard, tallow and the like.

Also suitable as part of the glycerides of the shortening are certain di- or triglycerides in which one or two of the hydroxyl groups of the glycerine have been esterified with "short-chain" fatty acids having from 2 to about 6 carbon atoms such as acetic, propionic, butyric, valeric, and caproic acids, and one or two of the remaining hydroxyl groups have been esterified with higher molecular weight fatty acids having from about 12 to about 22 carbon atoms.

The shortening of this invention also can contain glycerides prepared by random or by low-temperature directed rearrangement or interesterification reactions of fatty triglyceride-containing fats and oils, such as interesterified or rearranged cottonseed oil and lard; the glycerides also can be obtained by esterification reactions of synthetic or natural glycerine with higher molecular weight fatty acids having from about 12 to about 22 carbon atoms. The shortening of this invention also can contain portions of the higher molecular weight fatty acid mono- and diglycerides which are commonly prepared by reacting members of the above group of triglyceride fats and oils with an excess of glycerine.

The shortening of this invention can be prepared by various known means for making it plastic and workable at room temperature. Of course, naturally-occurring plastic fats, such as lard, will not necessarily need any further treatment to solidify or plasticize them. Liquid oils generally can be converted to plastic shortenings by partial hydrogenation of the unsaturated double bonds of the fatty acid constituents of the oil followed by conventional chilling and crystallization techniques or by proper admixture with sufficient triglycerides which are solid at room temperature to form a rigid interlocking crystalline structure which interferes with the free-flowing properties of the liquid oil. Suitable techniques for forming the plastic shortening are described, for example, in Bailey, Industrial Oil and Fat Products, at page 210 et seq. (2d ed. 1951).

It is essential that the shortening contain in admixture from about 0.2% to about 1.0%, by weight, of a fatty acid monoester of polyoxyethylene sorbitan containing an average of about 20 oxyethylene units per molecule, said fatty acid having from about 12 to about 22 carbon atoms per molecule. A preferred example of this additive material is polyoxyethylene (20) sorbitan monostearate which is also known as "Polysorbate 60" or "Tween 60." Other suitable specific examples are polyoxyethylene (20) sorbitan monooleate ("Tween 80"), polyoxyethylene (20) sorbitan monopalmitate ("Tween 40"), polyoxyethylene (20) sorbitan monolaurate ("Tween 20"), and mixtures thereof.

For purposes of this invention, the polyoxyethylene sorbitan monoester should be substantially hydrophilic. The substantially hydrophilic esters provide a desirable reduction in spattering during frying of foods with the shortening which is not obtained when the more lipophilic esters such as polyoxyethylene (20) sorbitan tristearate ("Tween 65"), polyoxyethylene (20) sorbitan trioleate ("Tween 85"), polyoxyethylene (5) sorbitan monooleate ("Tween 81"), or sorbitan monostearate ("Span 60"), are used. In addition, the use of fluidizing agents such as aluminum tripalmitate should be avoided since they are detrimental both to the plasticity of the shortening and to the desirable spatter reduction effects of the ester in the shortening of this invention.

It is also absolutely essential for the spatter reduction properties of the monoester to admix it in the shortening within limits of about 0.2% to about 1.0%, by weight. It has been found that at least about 0.2% by weight of the ester is essential to produce the desirable anti-spattering effects in the plastic shortening. Concentrations greater than about 1.0% do not show any further significant improvement in spatter reduction properties during frying; rather, such concentrations tend to impart noticeable undesirable taste and color to the plastic shortening.

As a referred embodiment of this invention, the polyoxyethylene (20) sorbitan monoester is subjected to an acidifying treatment with an acid such as phosphoric, sulfuric, hydrochloric or similar such acids, or is passed through an acid activated filtering clay such as "Superfiltrol." Although the pure monoester product probably does not exhibit a true pH, since it is essentially free of water, the monoester is preferably treated with acid media in the presence of a trace of water so that it ultimately shows a pH of less than 7 when measured by conventional pH measuring devices, for example, a Beckman pH meter. Alternatively, but less desirably, the acidifying treatment can be accomplished by adding the acid directly to the shortening so that an amount of about 5 to about 20 p.p.m. is available in the shortening for this purpose. As used in the specification and claims herein, the term "acid-treated" includes the above and similar such acidifying treatment. The acidifying treatment produces an acceptable plastic shortening with an optimum level of spatter reduction during frying. Even more importantly, it helps the shortening to retain its normal degree of whiteness in color (i.e., prevents discoloration) during conventional storage periods incurred in transit, on the retail shelf, and during consumer usage. Shortening produced according to this invention with untreated monoester tends to develop discoloration under normal storage and handling conditions and when used in repeated deep fryings.

According to one aspect of this invention, the polyoxyethylene (20) sorbitan monoester is combined with from about 0.01% to about 0.25%, and preferably about 0.025%, by weight, of an oil-insoluble, water-soluble sodium metaphosphate or other such similar oil-insoluble, water-soluble salts of phosphoric acid. These phosphoric acid salts reduce the total amount of spatter and invaluably cooperate with the polyoxyethylene (20) sorbitan monoester in providing substantially improved temperature recoverability and temperature conservation properties to the shortening during frying. In order to further improve their usefulness in the shortening, it is desirable to substantially reduce the particle size of the phosphoric acid salts, preferably to a particle size less than about 40 microns. Homogenizing the phosphoric acid salt in an oil slurry has been found to be suitable for this purpose.

Other oil-insoluble, water-soluble salts of phosphoric acid which are suitable for the above purposes include by way of example (a) sodium phosphate, dibasic, hexahydrate, (b) tetrapotassium pyrophosphate, anhydrous, (c) tetrasodium pyrophosphate, decahydrate, (d) sodium phosphate, tribasic, (e) sodium phosphate, monobasic, (f) sodium glycerophosphate, (g) sodium phosphate, dibasic, anhydrous, (h) Graham's salt, and (i) commercial sodium "hexametaphosphate" having an average of 14 metaphosphate monomer units per molecule.

The above shortening with the polyoxyethylene (20) sorbitan monoester and the phosphoric acid salt has excellent frying characteristics not only in terms of spatter reduction but also in terms of rate of browning and fat temperature recoverability and conservation. It has been discovered that when freshly prepared foods such as potatoes, chicken, fish, onion rings, and doughnuts as well as conventional frozen foods are deep fried in the above shortening, a substantial advantage is achieved in terms of the time required to achieve an attractive golden brown color compared with the same shortening without the polyoxyethylene (20) sorbitan monoester and phosphoric acid salt. In addition, a substantially faster temperature recoverability is obtained during frying after the fresh or frozen food is introduced into the hot melted shortening of this invention. As is well known, the introduction of cold, moist foods into hot fat tends to reduce the temperature of the fat. With the substantial improvement in temperature recoverability obtained with the shortening of this invention, a greater amount of food can be fried in a given amount of shortening over a fixed period of time, and with less loss of moisture in the fried food than otherwise possible. This desirable property, also referred to herein as "temperature conservation," is particularly useful in commercial or bulk frying where a large amount of food has to be fried and a savings in the time of frying and in the amount of heat which must be utilized is of great importance.

The shortening of this invention, in addition to the above-noted improvements in frying characteristics, exhibits excellent baking properties in the preparation of baked goods such as cakes, biscuits, and cookies. For example, typical layer cakes, such as conventional white, yellow and chocolate cakes, baked with the shortening of this invention have high volume per unit weight of batter and fine texture.

Various minor additives can also be used in the plastic shortening of this invention provided that they are not aesthetically undesirable and do not detract from the improved properties of the shortening. For example, small amounts of flavoring, coloring, and antioxidants such as butylated hydroxytoluene, butylated hydroxyanisole, and methyl silicone can be added to the shortening if desired.

The following examples will further illustrate this invention, although the invention is not limited to these specific examples.

EXAMPLE 1

Several types of commercially purchased frozen foods, i.e., chicken, fish, onion rings and potatoes, were deep fried in: Fat 1—a plastic shortening used for control purposes and Fat 2—the same plastic shortening which contained additionally in suspension 0.5%, by weight, polyoxyethylene (20) sorbitan monostearate (acid-treated) and 0.025%, by weight, of commercial oil-insoluble, water-soluble sodium hexametaphosphate. The control plastic shortening, Fat 1, comprised: (a) 95.5 parts by weight of a blend of partially hydrogenated soybean and cottonseed oils containing 5% substantially completely hydrogenated cottonseed oil and (b) 4.5 parts by weight of a mono-, di-, and triglyceride mixture prepared from a blend of partially hydrogenated soybean and cottonseed oils superglycerinated to a monoglyceride content of about 40%. In each case, the plastic shortenings, Fats 1 and 2, were initially melted and heated to 385° F.–386° F. The temperature control dials on the deep fryers were maintained at this temperature setting throughout the deep frying in order to supply a constant amount of heat to the fryers. Two equal portions of each food type were then separately deep fried in both Fats 1 and 2 until both samples of each food type reached the same color end point by visual determination, at which point the foods were sufficiently fried. Temperature readings of the fat samples were recorded at 2 minute intervals during the frying, except the readings of the fat used to fry the potatoes which were recorded every minute. This frying procedure was repeated four times for all chicken and potato samples for a total of five runs each, and five times for all fish and onion ring samples for a total of six runs each. Table I, below, shows the average temperature of the five or six runs, respectively, at each recorded time interval for both Fat 1 and Fat 2 with each food type until the completion of the frying. The last temperature in each column indicates the end point of the frying.

TABLE I

| Time Interval | Average Temperature of Fat in ° F. | | | | | | | |
|---|---|---|---|---|---|---|---|---|
| | Chicken | | Fish | | Onion Rings | | Potatoes | |
| | Fat 1 | Fat 2 | Fat 1 | Fat 2 | Fat 1 | Fat 2 | Fat 1 | Fat 2 |
| Initial | 386 | 386 | 385 | 386 | 386 | 386 | 385 | 386 |
| 1 minute | | | | | | | 306 | 313 |
| 2 minutes | 313 | 320 | 326 | 326 | 293 | 298 | 300 | 307 |
| 3 minutes | | | | | | | 300 | 307 |
| 4 minutes | 315 | 327 | 321 | 325 | 298 | 311 | 307 | 316 |
| 5 minutes | | | | | | | 310 | |
| 6 minutes | 322 | | 316 | | 304 | | | |
| 8 minutes | | | | | | | | |

The above results clearly show a substantial temperature conservation with the shortening of this invention, Fat 2, when used in deep frying of all of the above frozen foods. For example, the chicken was done within 4 minutes when fried in the shortening of this invention but took 6 minutes when fried in the same shortening without the polyoxyethylene (20) sorbitan monostearate and sodium hexametaphosphate. Not only are the foods fried more rapidly in the shortening of this invention, but the shortening has a higher temperature at the completion of the frying than a similar plastic shortening without the additives of this invention. This temperature conservation enables the frying of a greater amount of food over a shorter period of time with a given amount of heat than otherwise obtainable.

For example, in the continuous deep frying of frozen chicken for restaurant or other commercial purposes, the amount of chicken that might ordinarily be fried in a 12 hour period could readily be fried in less than 8 hours by substituting the shortening of this invention for a conventional shortening. Or to put it another way, if 80 pounds of chicken can be fried by a restaurant in a given period of time with an ordinary shortening, well over 120 pounds could be fried with the shortening of this invention over that same period of time.

The temperature conservation obtained with the shortening of this invention also reduces the loss of moisture during the frying of the food. Consequently, the foods fried with the shortening of this invention are not so dried out as they otherwise would be and, therefore, have better eating qualities.

EXAMPLE 2

Several types of fresh foods (as opposed to frozen foods), i.e. chicken, potatoes, fish, onion rings, and doughnuts were deep fried in the manner described in Example 1. The frying procedure was repeated four times for all doughnut samples, five times for all chicken and onion ring samples, eight times for all fish samples and twenty-seven times for all potato samples. Table II, below, shows the same type of average temperature recordings for these frying runs as recorded in Table I of Example I, above.

according to the procedure of Example 3. The following table shows the grams of spatter with various levels of the monoester in Fat 3.

TABLE II

| Time Interval | Average Temperature of Fat in ° F. | | | | | | | | | |
|---|---|---|---|---|---|---|---|---|---|---|
| | Chicken | | Potatoes | | Fish | | Onion Rings | | Doughnuts | |
| | Fat 1 | Fat 2 | Fat 1 | Fat 2 | Fat 1 | Fat 2 | Fat 1 | Fat 2 | Fat 1 | Fat 2 |
| Initial | 383 | 384 | 384 | 384 | 384 | 384 | 383 | 383 | 385 | 386 |
| 45 seconds | | | | | | | | | 376 | 379 |
| 90 seconds | | | | | | | | | 367 | 374 |
| 2 minutes | 339 | 334 | 299 | 310 | 335 | 341 | 316 | 320 | | |
| 4 minutes | 336 | 340 | 310 | 331 | 343 | 347 | 321 | 327 | | |
| 6 minutes | 341 | 343 | 315 | 350 | 345 | 352 | 328 | 338 | | |
| 8 minutes | 344 | 343 | 321 | 348 | | | | | | |
| 10 minutes | 345 | 1 346 | | | | | | | | |

1 Although the temperature conservation results with fresh chicken are not nearly as dramatic as with frozen chicken, the improved results with other fresh foods are substantially equivalent to the results with frozen foods as can be seen from this table.

The oxidative stability of Fat 2 in Examples 1 and 2, above, during the deep frying is comparable to the oxidative stability of Fat 1.

EXAMPLE 3

Fats 1 and 2 of Example 1 were used for frying frozen minute steaks and the spattering from the frying pan was collected and measured in order to determine the amount of spatter reduction achieved with the 0.5% polyoxyethylene (20) sorbitan monostearate and 0.025% sodium hexametaphopshate additives. The frying was done in 10 inch Sunbeam Electric Frypans at both 360° F. and 420° F. The lower temperature represents the customary frying temperature, but frying was also conducted at the higher temperature in order to demonstrate improved spatter reduction under very rigorous frying conditions. The frozen steaks (75 g. each) were placed in the center of the frying pan after the fat (30 g.) had been heated to the test temperature and were fried 2½ minutes on each side. The spattering during frying was collected on a 3 foot by 3 foot square of aluminum foil placed under the frying pan and was measured by calculation of the difference in the weight of the original foil and the foil with spattering. The following table indicates the grams of spatter for Fats 1 and 2 and the percentage of spatter reduction achieved with the above additives in Fat 2.

TABLE III

| | Grams of Spatter | | Spatter Reduction, Percent |
|---|---|---|---|
| | Fat 1 | Fat 2 | |
| Frying Temperature, ° F.: | | | |
| 360 | 3.46 | 0.35 | 90 |
| 420 | 7.37 | 1.27 | 83 |

As can be readily seen from the above table, the shortening of this invention provides a very substantial reduction in spattering during frying compared to a similar shortening which did not contain the additives of this invention.

EXAMPLE 4

Fat 1 of Example 1 was compared with Fat 3 which was identical to Fat 2 of Example 1 except that the monoester was not acid-treated. Frying was conducted

TABLE IV

| | Grams of Spatter With Varilus Weight Percentages of Monoester | | | | |
|---|---|---|---|---|---|
| | 0% 1 | 0.25% | 0.50% | 1.0% | 2.0% |
| Frying Temperature, 420° F | 9.06 | 2.56 | 1.16 | 0.46 | 0.37 |

1 Fat 1.

When the grams of spatter reduction are calculated from the above table by difference and converted to percentages, it is found that 95% of the spatter is eliminated when 1% of the monoester is used in the shortening but that doubling the amount of monoester (2%) provides no further "significant" spatter reduction (i.e., 96%). However, it has been discovered that use of greater than about 1% monoester in the shortening causes a very undesirable taste in the shortening and a noticeably undesirable color change (yellowing) upon heating of the shortening during frying. Use of less than about 0.2% monoester is insufficent to provide desirable spatter reduction.

Comparable reduction in spatter is obtained when 0.1% sodium phosphate, dibasic, heptahydrate is substituted for the 0.025% sodium hexametaphosphate in the above example. No substantial spatter reduction is obtained when calcium glycerophosphate and water-insoluble sodium metaphosphate having several thousand metaphosphate monomer units are substituted for the water-soluble sodium hexametaphosphate in the above example.

EXAMPLE 5

Fat 1 of Example 1 was compared with Fat 4 which was similar to Fat 3 of Example 4 except that sodium hexametaphosphate was not employed in the composition. Frying was conducted according to the procedure of Example 3 except that the spattering was collected on an absorbent plate placed directly over the top of the frying pan instead of on a sheet of foil placed under the pan. (a) Frying conducted at 360° F. with 0.1% monoester in Fat 4 showed a reduction in spatter to 6.95 grams from the 8.79 grams of spatter obtained when 0% monoester was used. Such a relatively small reduction in spatter (21%) is not within the scope of this invention primarily because it is insufficient to be noticeable as an improvement by the user of the shortening. The frying when repeated with 0.25% monoester produced only 2.78 grams of spatter which is equivalent to 68% reduction in spatter. This is a substantial and noticeable reduction in spatter included within the scope of this invention. (b) Frying conducted at 420° F. with 0% compared with 0.25%, 0.5%, and 1.0% of the monoester showed spatter reduction from 21.36 grams to 6.94 grams, 4.68 grams, and 3.59 grams, respectively (equivalent to 68%, 78%, and 84% reduction. Such spatter reduction is substantial though not as high as obtained by the invaluable cooperation of the monoester and phosphoric acid salt.

EXAMPLE 6

Examples 4 and 5 were repeated at 420° F. frying temperature except that polyoxyethylene (20) sorbitan monooleate was substituted for the polyoxyethylene (20) sorbitan monostearate of those examples. The spatter (7.85 g.) at 0% of monoester was reduced to 1.78 g. when only 0.5% monoester was used in the composition and to 1.11 g. when both 0.5% monoester and 0.025% sodium hexametaphosphate were used in the composition.

Comparable substantial spatter reduction is obtained when polyoxyethylene (20) sorbitan monopalmitate and polyoxyethylene (20) sorbitan monolaurate are substituted for the polyoxyethylene (20) sorbitan monooleate in the above example. No substantial spatter reduction is obtained when polyoxyethylene (20) sorbitan tristearate, polyoxyethylene (20) sorbitan trioleate, polyoxyethylene (4) sorbitan monostearate, and sorbitan monostearate are substituted for the polyoxyethylene (20) monooleate in the above example.

EXAMPLE 7

Fats 5 and 6 were prepared which were similar to Fats 1 and 2, respectively, of Example 1 except that the mono- and diglycerides were not employed in the compositions. Fats 5 and 6 were compared with each other according to the frying procedure of Example 3. The spatter (8.42 g.) of Fat 5 with no polyoxyethylene (20) sorbitan monoester or phosphoric acid salt was reduced to 2.86 g. when 0.5% polyoxyethylene (20) sorbitan monostearate and 0.025% sodium hexametaphosphate were employed in the composition to form Fat 6.

EXAMPLE 8

Fats 7 and 8 were prepared which were similar to Fats 1 and 4, respectively, of Example 5 except that the soybean oil was replaced with cottonseed oil. Fats 7 and 8 were compared with each other according to the frying procedure of Example 3. The spatter (7.86 g.) of Fat 7 with no polyoxyethylene (20) sorbitan monoester was reduced to 1.30 g. when 0.5% polyoxyethylene (20) sorbitan monostearate was employed in the composition to form Fat 8.

EXAMPLE 9

Fat 2 of Example 1 and Fat 3 of Example 4 were subjected to one month storage periods at both 70° F. and 90° F. and then tested for their Hunter "b" colors with a Hunter Color Difference Meter. Fat 3 had Hunter "b" colors of 7.1 and 8.9 after storage at 70° F. and 90° F., respectively, whereas Fat 2 had Hunter "b" colors of 7.0 and 8.1. The lower color readings for Fat 2 indicate the improved whiteness of the shortening of this invention obtained by the acid treatment.

EXAMPLE 10

Fats 1 and 2 of Example 1 along with Fat 3 of Example 4 were also tested for their Lovibond colors by melting and holding at 140° F. for up to three days. The following table records the Lovibond color readings of these fat samples.

TABLE V

| Fat | Lovibond Colors, Days at 140° F. | | | |
|---|---|---|---|---|
| | 0 | 1 | 2 | 3 |
| Fat 1 | [1] 5/0.5 | 6/0.6 | 7/0.7 | 10/1.0 |
| Fat 2 | 5/0.5 | 6/0.6 | 8/0.8 | 11/1.1 |
| Fat 3 | 5/0.5 | 8/0.8 | 12/1.2 | 13/1.3 |

[1] Yellow/red.

The lower Lovibond color readings of Fat 2 compared with Fat 3 indicate the reduction in discoloration obtained by the acid treatment of Fat 2.

EXAMPLE 11

The flavor of Fat 2 of Example 1 was tested by a panel of experts. The concentration of polyoxyethylene (20) sorbitan monostearate in the composition was varied between 0.5% and 5.0% by weight and an average taste rating was obtained for Fat 2 at each level of concentration as shown in the following table.

TABLE VI

| Percent Concentration of Monoester in Fat 2 | Rating on Scale of 1 to 10 |
|---|---|
| 0.5 | 7.0 |
| 1.0 | 6.3 |
| 2.0 | 3.3 |
| 5.0 | 3.0 |

A rating of 10 represents an absolutely bland shortening which is practically unobtainable with a suitable commercial shortening. Any rating of 5 or greater represents a suitable taste for a marketable shortening which the average person ordinarily cannot detect. A rating of 6 to 7 indicates a very slight taste which is barely noticeable to the panel of experts. Any rating of less than 5 represents an undesirably strong taste which would render the shortening unsuitable for commercial use. A rating as low as about 3 is extremely undesirable. These results give further support to applicant's required upper limit in concentration of about 1% monoester in the shortening.

EXAMPLE 12

The shortenings of this invention have been used to prepare cakes of excellent quality having high volume and fine texture. For example, cakes of over 1200 cc. volume per 400 g. batter are produced with Fat 2 of Example 1 with ingredients as follows:

Yellow type cake

Ingredients: Percent by weight
- Sugar _____ 35-50
- Flour _____ 35-50
- Shortening _____ 9-15
- Non-fat dried milk solids _____ 0.5-5.0
- Salt _____ 0.5-2.0
- Leavening _____ 1.0-4.0
- Egg solids _____ 0-5.0
- Flavoring _____ 0.1-5.0
- Coloring, minor amount.

Chocolate type cake

Ingredients: Percent by weight
- Sugar _____ 35-40
- Flour _____ 25-40
- Shortening _____ 9-15
- Non-fat dried milk solids _____ 0.5-3.0
- Leavening _____ 1.0-4.0
- Cocoa _____ 4.0-8.0
- Salt _____ 0.5-2.0
- Flavoring _____ 0.1-1.0
- Coloring, minor amount.

White type cake

Ingredients: Percent by weight
- Sugar _____ 35-50
- Flour _____ 35-50
- Shortening _____ 9-15
- Non-fat dried milk solids _____ 0.5-5.0
- Salt _____ 0.5-2.0
- Leavening _____ 1.0-4.0
- Flavoring _____ 0-5.0

The ingredients, in the amount of about one pound 2½ ounces, are mixed with about 1⅓ cups of water and with two eggs in the case of yellow and chocolate cakes or with two egg whites in the case of white cakes in a mixing bowl and beaten for about two minutes at medium speed with a table model electric mixer and then baked in an oven at 350° F. until done (about 25 to 35 minutes with an 8 to 9 inch round layer pan).

In addition to the above specific uses, the shortening of this invention can be used for many other cooking purposes; and many more examples of the shortening of this invention will become readily apparent to the person skilled in the art after reading the above specification and the appended claims.

What is claimed is:

1. A plastic shortening suitable for frying and baking comprising fatty glyceride having admixed therewith from about 0.2% to about 1.0%, by weight, of an acid-treated fatty acid monoester of polyoxyethylene sorbitan containing an average of about 20 oxyethylene units per molecule, said fatty acid having from about 12 to about 22 carbon atoms per molecule, said acid treatment being sufficient to give the monoester a pH of less than 7 in the presence of a trace of water, and from about 0.01% to about 0.25%, by weight, of an oil-insoluble, water-soluble salt of phosphoric acid.

2. The shortening of claim 1 in which the monoester is polyoxyethylene (20) sorbitan monostearate.

3. The shortening of claim 1 in which the salt is an oil-insoluble, water-soluble sodium metaphosphate.

4. A plastic shortening suitable for frying and baking comprising fatty glyceride having admixed therewith about 0.5%, by weight, acid-treated polyoxyethylene (20) sorbitan monostearate and 0.025%, by weight, of an oil-insoluble, water-soluble sodium metaphosphate, said acid treatment being sufficient to give the monoester a pH of less than 7 in the presence of a trace of water.

5. The process of preparing a plastic shortening which is suitable for frying and baking, which comprises: acid treating a fatty acid monoester of polyoxyethylene sorbitan containing an average of about 20 oxyethylene units per molecule, said fatty acid having from about 12 to about 22 carbon atoms per molecule, to give the monoester a pH of less than 7 in a trace of water, and admixing in a fatty glyceride from about 0.2% to about 1.0% by weight of said acid-treated monoester, and from about 0.01% to about 0.25% by weight of an oil-insoluble, water-soluble salt of phosphoric acid.

References Cited

UNITED STATES PATENTS

| | | | |
|---|---|---|---|
| 2,629,664 | 2/1953 | Watts et al. | 99—163 |
| 2,681,283 | 6/1954 | Kuhrt | 99—163 |
| 3,093,481 | 6/1963 | Eckey et al. | 99—118 |
| 3,228,772 | 1/1966 | Buddemeyer et al. | 99—123 XR |

MAURICE W. GREENSTEIN, *Primary Examiner.*

A. LOUIS MONACELL, *Examiner.*